United States Patent [19]

Greger

[11] 4,107,713
[45] Aug. 15, 1978

[54] FILM FEED MECHANISM FOR CAMERAS

[75] Inventor: Paul Greger, Braunschweig, Germany

[73] Assignee: Rollei-Werke Franke & Heidecke, Braunschweig, Germany

[21] Appl. No.: 767,776

[22] Filed: Feb. 11, 1977

[30] Foreign Application Priority Data

Feb. 17, 1976 [DE] Fed. Rep. of Germany ....... 2606131

[51] Int. Cl.² ............................................ G03B 19/02
[52] U.S. Cl. ................................................. 354/209
[58] Field of Search ............... 354/202, 226, 209, 213, 354/214, 204, 212

[56] References Cited

U.S. PATENT DOCUMENTS

| 2,245,213 | 6/1941 | Mihalyi | 354/205 |
| 2,571,661 | 10/1951 | Bing et al. | 354/204 X |
| 3,485,156 | 12/1969 | Takahashi et al. | 354/214 |
| 3,911,456 | 10/1975 | Umemura | 354/209 |

FOREIGN PATENT DOCUMENTS 1,221,897 7/1966 Fed. Rep. of Germany ........... 354/209

Primary Examiner—Donald A. Griffin

Attorney, Agent, or Firm—Stonebraker, Shepard & Stephens

[57] ABSTRACT

A photographic camera in which a manually operable shutter tensioning member normally serves, through gearing, to advance the film simultaneously with tensioning or cocking the shutter. A manually operable control member has three positions. In its central position, the gearing meshes in normal operative condition so that the movement of the shutter tensioning member drives both the film metering sprocket and the film take-up spool, so as to feed the film ready for the next exposure. In one extreme position of the control member, the gearing is disconnected so that the shutter tensioning member can be moved to tension the shutter without driving either the film measuring sprocket or the film take-up spool, and at the same time the part of the gearing connected to the take-up spool is frictonally locked to prevent accidental undesired movement of the take-up spool. In the other extreme position of the control member, the gearing is likewise operatively disconnected from the shutter tensioning member, but it is not frictionally locked, so that the take-up spool and the metering sprocket are free to turn when rotary force is being applied in the conventional manner to the original supply spool to rewind the exposed film onto the supply spool.

15 Claims, 3 Drawing Figures

FILM FEED MECHANISM FOR CAMERAS

BACKGROUND OF THE INVENTION

Many kinds of photographic cameras are known, in which the shutter tensioning or cocking mechanism is coupled or interconnected with the film feeding mechanism, so that a single movement of a single member (usually a manually operable lever on the top or bottom of the camera) serves both to tension or cock the shutter and to feed the film, advancing it through the distance of one frame. In most of these known cameras, the mechanism automatically prevents a double exposure, because a fresh exposure cannot be made until the shutter has been cocked or tensioned, and the more act of tensioning the shutter serves to advance the film.

However, there are circumstances when a photographer may purposely wish to make a double exposure. Some cameras have provision for this, allowing the shutter to be tensioned for another exposure without advancing the film. But the mechanism to accomplish this is usually complicated and expensive, and liable to get out of order.

An object of the present invention is the provision of mechanism which, in a normal or basic mode of operation, will advance the film simultaneously with tensioning the shutter, and which, when desired, can be shifted so that the shutter may be tensioned independently of any feeding movement of the film, and at the same time to accomplish this by the use of mechanism which is comparatively simple, inexpensive, sturdy in use, and not to get out of order.

Another object is the provision of such mechanism in which there is a gearing connection between a shutter tensioning member and a film winding member, and in which such gearing connection can be operatively disconnected when desired, in a comparatively simple manner.

Still another object is the provision of such disconnectable gearing or coupling means so designed and constructed that the means for disconnecting it serves the double purpose of disconnecting the gearing to allow the making of a double exposure, and disconnecting it to allow the rewinding of the exposed film onto the original supply spool.

A further object is the provision of such mechanism so designed that the film take-up spool is firmly clamped in a non-rotatable position when the gearing is disconnected for the purpose of making a double exposure, but is not clamped and is free to rotate when the gearing is disconnected for the purpose of rewinding the film onto the supply spool.

A still further object is the provision of such disconnectable mechanism so designed that after the making of one double exposure, the gearing is automatically reconnected to its normal operating condition, to prevent the accidental making of a second double exposure, although permitting the gearing to be again purposely disconnected to permit another exposure on the same film frame, if desired.

DESCRIPTION OF THE PREFERRED EMBODIMENT

Figure 1:
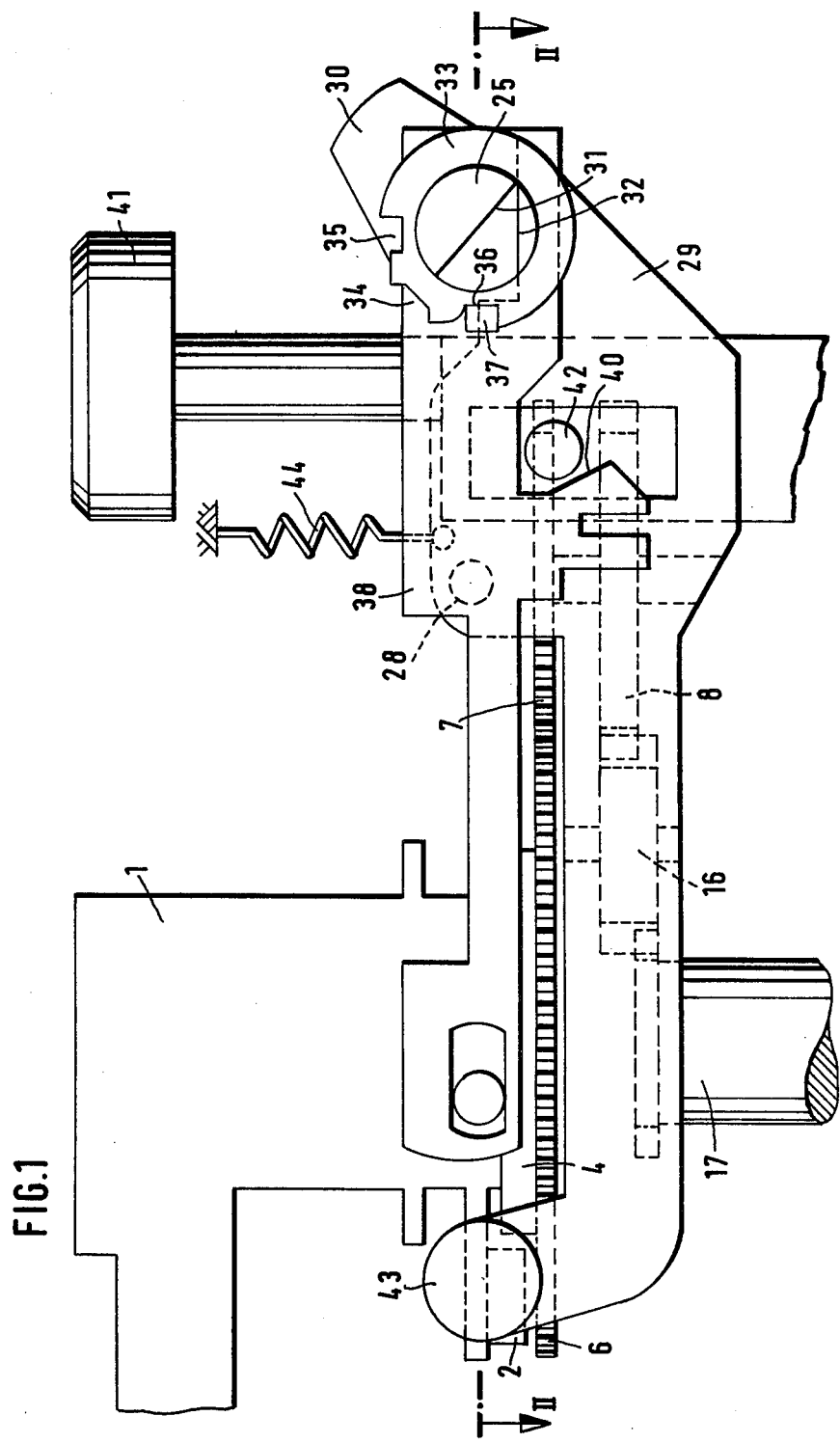
FIG. 1 is a side elevational view of mechanism in accordance with a preferred embodiment of the invention, with parts omitted.

The camera in general is of known construction, the details of which are not important for purposes of the present invention, and are not here shown or described. As usual in modern cameras, there is a pivoted operating lever 1 which, upon being manually swung through a certain distance, serves to tension or cock the conventional shutter (not shown) in the known way. In typical cameras according to the prior art, this movement of the lever 1 would also feed the film through a space of one frame, and this is also true according to the present invention when the mechanism is operated in what may be called the basic way or mode of operation. However, the present invention provides means for disconnecting or rendering inoperative the coupling between the lever 1 and the film feed, for the dual purpose of permitting the lever to be operated to tension or cock the shutter for a new exposure without advancing the film, when multiple exposures are desired, and of allowing the film contacting members to rotate in a reverse direction (reversely with respect to the forward film feeding direction) when the film is to be rewound back from the take-up spool to the supply spool, upon completion of the exposures. It is the mechanism which accomplishes this in an efficient, reliable, and economical way which forms the subject matter of the present invention.

The lever 1 is mounted to swing coaxially with a toothed or ratchet disk 4 which, in turn, is coaxial with and fixed to the gear 6. A pawl 2 (FIGS. 1 and 2) pivoted to an arm on the operating lever 1 has a nose adapted to engage the teeth of the ratchet wheel 4, and a spring 3 tends to swing the pawl to engage the teeth. Thus when the lever 1 is swung in a counterclockwise direction (when viewed from above as in FIG. 2) the pawl will cause corresponding counterclockwise motion of the disk 4 and the gear 6 connected thereto. When the operating lever is swung back in a clockwise direction to its limit or rest position, a stationary abutment 5 engages a tail of the pawl and swings the pawl out of engagement with the disk 4.

Figure 3:
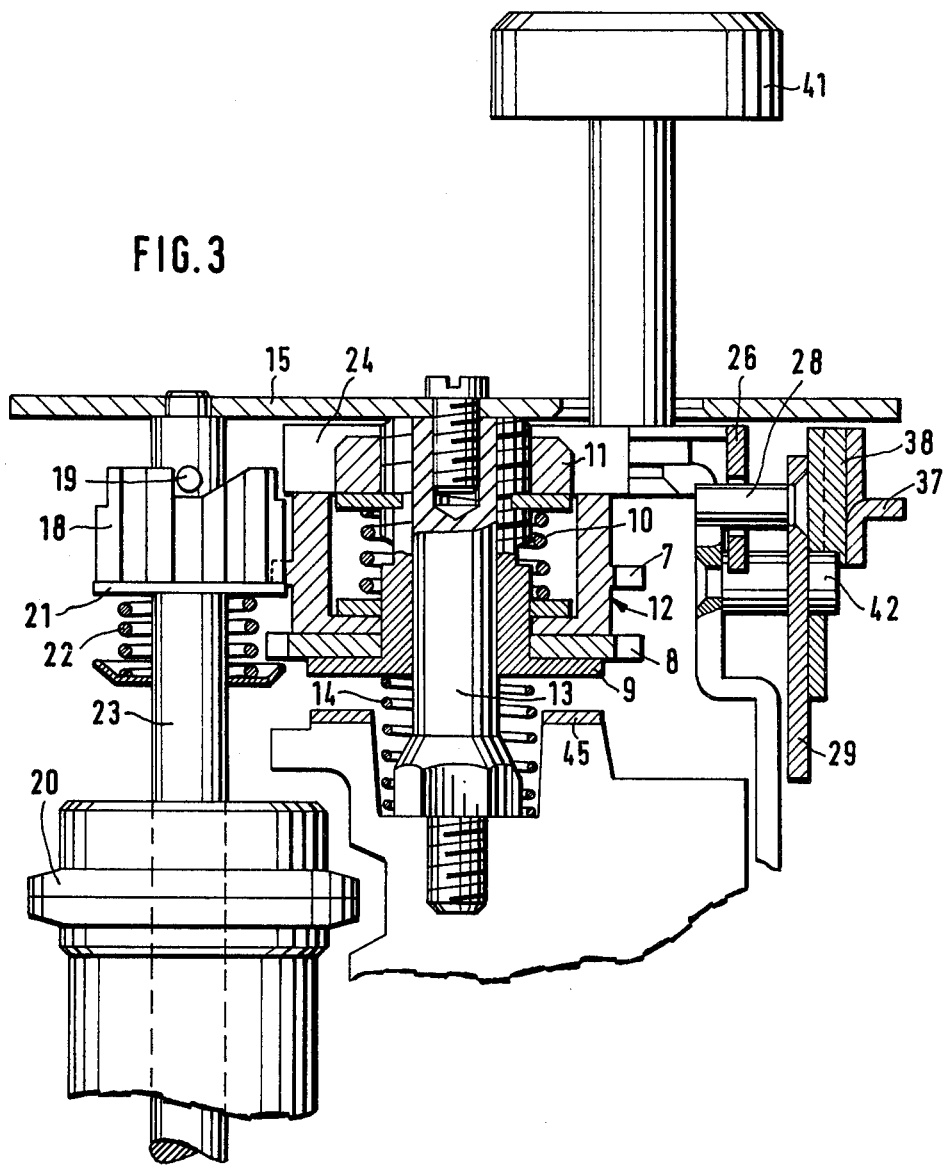
FIG. 3 is a view of the same partly in elevation and partly in vertical section approximately on the line III—III of FIG. 2.

In the basic or normal mode of operation, when it is desired to feed the film simultaneously with tensioning the shutter, the gear 6 meshes with a gear 7 which is, however, displaceable axially to unmesh it from the gear 6. This gear 7, as best seen in FIG. 3, is formed on the periphery of a hollow hub rotatable on a bushing 9. Another gear 8 is also rotatable on the same bushing 9, between the lower end of the hub of the gear 7 and a supporting radial flange on the hub 9. A spring 10 surrounds the bushing 9 and presses downwardly on the hub of the gear 7 and upwardly on a washer held by a nut 11 screwed on a threaded part at the top of the bushing 9. These parts just described from a frictional slip clutch indicated in general at 12, between the gear 7 and the gear 8. The frictional force of the clutch can be adjusted by means of the nut 11, which is accessible from the outside for this purpose.

The slip clutch assembly 12 is rotatable on and also displaceable axially on a pin 13 and is constantly pressed upwardly on such pin by a spring 14, tending to hold the upper end of the bushing 9 of the clutch against the lower surface of the stationary plate 15. However, in a manner to be described below, the clutch assembly 12 can be displaced axially downwardly on the pin 13, compressing the spring 14 and bringing the bottom of the bushing into engagement with stationary flanges 45 on a fixed part of the mechanism, thereby frictionally holding the bushing 9 against rotation. In this lower displaced position, the gear 7 is disengaged from the gear 6 with which it is engaged when the slip clutch assembly is in its uppermost position, tight against the fixed plate 15.

It may be noted that the diameter of the part of the bushing 9 which bears against the bottom of the plate 15 in the uppermost position of the slip clutch assembly is a relatively small diameter, so that the bushing is free to rotate when in this position, with very little frictional resistance. However, when the slip clutch assembly is moved downwardly to its extreme lower position, there is a relatively large diameter of the bottom flange of the bushing 9 which is in tight engagement with the stationary flange 45, so that in this position there would be great frictional resistance to any attempted turning of the bushing 9, thus resulting in an effective frictional blocking of the slip clutch assembly against rotation when it is its extreme lowest position.

In the basic or uppermost position of the slip clutch assembly, the gear 8 meshes with an intermediate gear 16 (FIGS. 1 and 2) which, in turn, meshes with a gear on the take-up spool drive member 17 (FIG. 1) which is connected in the usual way to the conventional take-up film spool (not shown) in the camera. Also, when the slip clutch assembly 12 is in its basic or uppermost position, the gear 7 thereof meshes with an intermediate gear 18 (FIGS. 2 and 3) which has on its upper face one or more radial notches engaging one or more radial pins 19 on the shaft 23 on which the gear 18 is rotatably mounted. Fixed to this shaft 23 is the film metering roller 20 having the usual spikes or sprocket teeth engaging in the conventional sprocket holes of the strip of film. The usual conventional metering mechanism is driven from the parts 20, 23 to measure the appropriate length of film at each film advancing or feeding step, to insure that only the desired amount of film is fed. The details of this are not important for purposes of the present invention, and are not here illustrated.

The gear 18 is axially displaceable on the shaft 23, as well as being rotatable with respect to this shaft. A flange 21 is fixed to or formed integrally with the lower end of the gear 18. A coiled spring 22, surrounding the shaft 23, is supported by a fixed part and reacts upwardly against the bottom flange 21 of the gear, tending to hold the gear 18 in its uppermost position where the pin 19 lies in a notch in the upper face of the gear, thereby forming a driving connection or coupling between the gear and the shaft. However, if the gear 18 is shifted axially downwardly on the shaft 23, compressing the spring 22, then the coupling connection between the shaft and the gear is disconnected and the shaft may turn freely independently of the gear, as in the case of rewinding the film in a reverse direction on to the original supply spool.

For depressing the slip clutch assembly 12 from its basic position above described to its disengaged position (disengaged, that is, from the gear 6) there is a bifurcated rocker arm or shifter arm 24 (FIGS. 2 and 3) rotatably mounted on a shaft 25 (FIGS. 1 and 2) and adapted to swing upwardly and downwardly on this shaft, to a limited extent. The bifurcated portion of this rocker arm straddles the nut 11 and overlies the upper surface of the hollow hub of the gear 7. In addition to the bifurcated part which overlies the slip clutch assembly, the rocker arm also includes a lateral arm 26 (FIGS. 2 and 3) containing a slot 27 (FIG. 2) which loosely receives a pin 28 (FIGS. 1, 2, and 3) secured to and projecting laterally from a lever 29 which is mounted for limited upward and downward swinging movement on a pivot 43 which is on a fixed part of the structure and at the left end of the lever 29 when viewed as in FIG. 1. A spring 44 tends to swing the right end of the lever upwardly to its uppermost position.

The above mentioned shaft 25, on which the rocker arm 24, 26 is rotatably mounted, extends out through a side wall of the camera and is provided, outside the housing or casing of the camera, with an operating knob 30 (FIGS. 1 and 2) which may be manually grasped to turn the shaft 25 to any one of its three positions. A nose on the knob 30 cooperates with suitable markings or legends visible on the adjacent portion of the housing or casing, to indicate the three positions, the middle position being the basic operating position wherein film is fed through the space of one frame each time the lever 1 is operated to cock or tension the shutter. The next position counterclockwise (when viewed as in FIG. 1) from this basic position is the position for double or multiple exposure on the same film frame, and the next position clockwise from the basic position is the position for rewinding the film on to the supply spool, as will be further explained below.

At the opposite end of the shaft 25 from the operating knob 30, one-half of the thickness of the shaft is milled away to provide the diametrical shoulder 31 (FIG. 1) which constitutes what may be called a trip surface or cam surface and which overlies a surface 32 on the previously mentioned lever 29, near the right end of such lever. When the operating knob 30 and shaft 25 are turned to the intermediate or middle one of their three positions, that is, to the basic position, the diametrical shoulder 31 is horizontal (when viewed as in FIG. 1) and the lever 29 can rise, under the influence of its spring 44, to its uppermost position. If the control knob 30 and shaft 25 are turned in either direction from this basic position, one or the other of the corners at the ends of the diametrical part 31 will act as a cam bearing downwardly on the part 32 of the lever 29, depressing the lever against the force of its spring 44.

Figure 2:
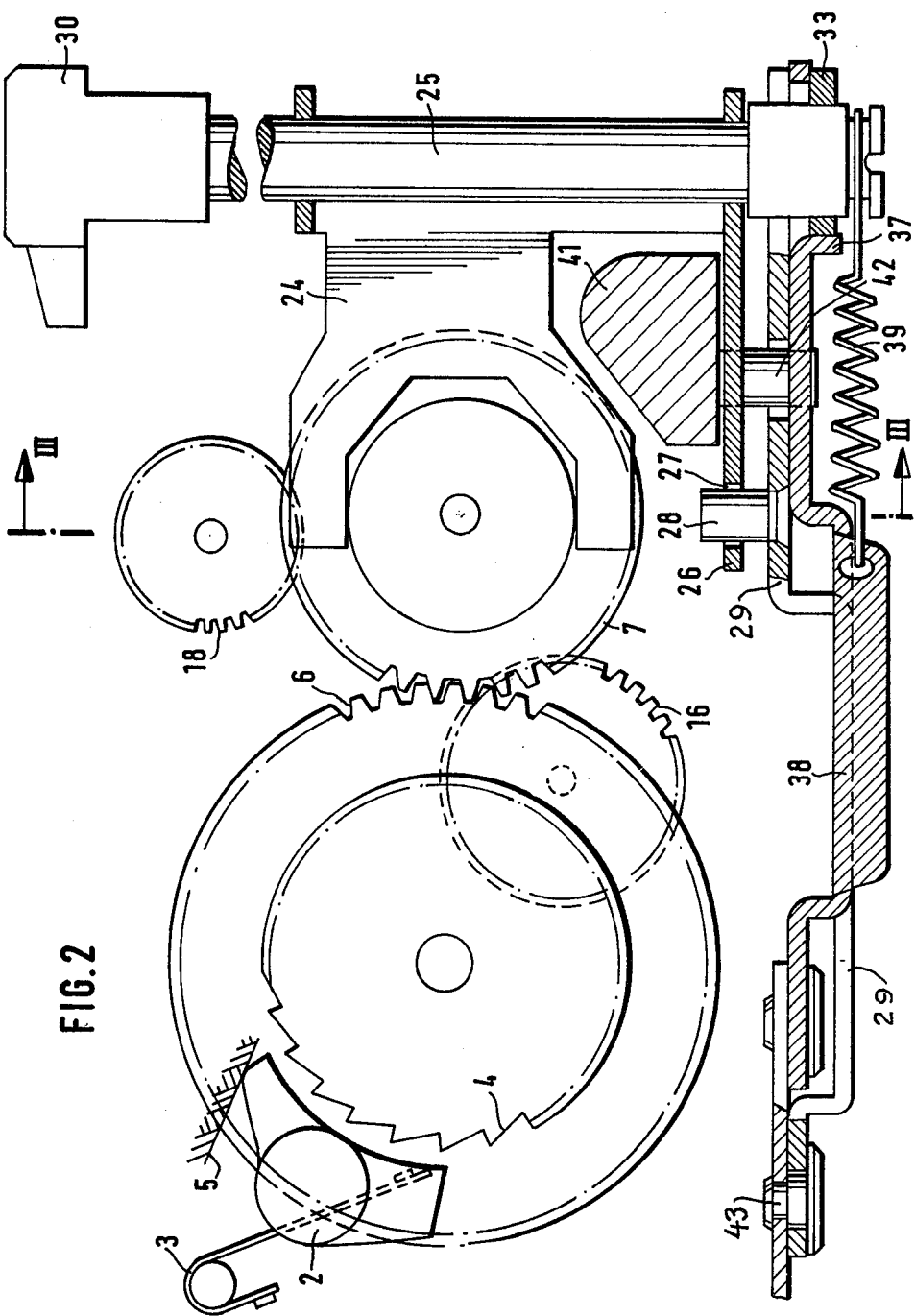
FIG. 2 is a view of the same partly in plan and partly in horizontal section taken approximately on the line II—II of FIG. 1.

A disk 33 (FIGS. 1 and 2) is fixed to the shaft 25 and has three radial notches 34, 35, and 36 in its circumference. Cooperating with these notches is a nose or lug 37 (FIGS. 1, 2, and 3) projecting laterally from a slide 38 which is mounted for limited sliding movement in an approximately horizontal direction when viewed as in FIG. 1. A spring 38 (FIG. 2) tends to move the slide 38 rightwardly to hold the lug 37 thereof against the periphery of the disk 33 on the shaft 25. When the shaft is in its basic position (the middle one of its three positions) the lug 37 lies in the notch 34 of the disk 33, the ends of this notch being inclined or beveled so that the shaft 25 may be easily turned in either direction from its basic position, camming the lug 37 out of the notch 34. When the shaft 25 is turned to its extreme counterclockwise position (approximately 90° counterclockwise from the position shown in FIG. 1) the lug 37 on the slide enters the notch 35. The ends of this notch are not beveled but are square, so that the shaft 25 is latched in this position and cannot be rotated away from it, until released by mechanism described below. When the shaft 25 is turned to its extreme clockwise position (which is the position in FIG. 1) then the lug 37 enters the notch 36, the clockwise end of which is inclined or beveled so that the shaft can be turned counterclockwise from this position, camming the lug 37 out of the notch. As illustrated in FIG. 1, the middle notch 34 is shallower than the notches 35 and 36, so that when the lug 37 is in this middle notch 34, the slide 38 will be held somewhat further to the left than when the lug is in either the notch 35 or the notch 36.

The slide 38 has an inclined cam surface 40 which, under certain conditions, is engaged by a pin 42 projecting laterally from the camera release member 41. This release member 41, sometimes called the trip or the trigger member, is the member which, in the well known conventional way, serves to operate the shutter or otherwise initiate the camera exposure cycle, when the member 41 is depressed. The cam surface 40 on the slide 38 is so placed with respect to the pin 42 on the camera release that when the lug 37 lies in the shallow notch 34, the slide is held far enough to the left so that the pin 42 will not engage the cam portion 40 when the camera release 41 is depressed, and therefore the operation of the camera release will not cause any movement of the slide 38. However, when the lug 37 is in either the notch 35 or the notch 36, the slide is a little further to the right (when viewed as in FIG. 1) and then, when the camera release 41 is depressed, the pin 42 will engage the inclined cam surface 40 and will move the slide 38 leftwardly against the force of its spring 39, thereby withdrawing the lug 37 from the notch 35 or 36, as the case may be. When the lug is thus withdrawn, the upward pressure of the lever 29 (caused by the spring 44) acts on one or the other corner of the diametrical flat portion 31 of the shaft 25, and this upward pressure of the lever 29 will turn the shaft 25 back to its intermediate or basic position.

The notches 35 and 36 are so placed with respect to the central notch 34 that a lesser degree of rotation of the shaft 25 is required, from its central position, to bring the notch 36 opposite the lug 37, and a somewhat greater degree of rotation from the central position is required, to bring the notch 35 to a position opposite the lug 37. Thus when the shaft 25 is turned to the position illustrated in FIG. 1, to bring the notch 36 opposite the lug 37 (this being the film rewinding position) the lever 29 will not be quite to its extreme position, and the action of the pin 28 on this lever 29, acting on the arm 26 of the forked shifter 24, will depress the clutch assembly 12 far enough to disengage the gear 7 from the gear 6, but not far enough to bring the bottom of the bushing 9 down firmly on the stationary member 45. Thus the slip clutch assembly is not locked against rotation, during the rewinding operation. But when the shaft 25 is turned to its extreme counterclockwise position, bringing the notch 35 to the lug 37, the lever 29 is depressed a little farther, and then the pin 28 moves the lever 26 and forked shifter 24 far enough downwardly to bring the bottom surface of the bushing 9 of the slip clutch assembly firmly onto and hold it against the stationary flange 45, thereby frictionally locking the slip clutch assembly against rotation during the double exposure operation.

The operation of the mechanism may be summarized as follows: When the operator desires to make the camera ready for an exposure in the basic or normal mode of operation (i.e., with only a single exposure on each frame of the film) the shaft 25 and its control knob 30 are left in the basic or central position, roughly 45° to the left or counterclockwise from the position illustrated in FIG. 1. The flat surface 31 at the end of the shaft 25 is then horizontal, and the lever 29 can rise to the maximum extent (under the influence of the spring 44) until the flat surface 32 bears against the entire length of the flat surface 31 on the shaft. In this position, the shifter fork 24 is raised to its upper position, allowing the spring 14 to raise the slip clutch assembly 12 to its uppermost position, with the upper end of the slip clutch assembly bearing lightly against the lower surface of the stationary plate 15.

The operator then swings the lever 1 through its range of movement, first in one direction and then back in the opposite direction. This, through the pawl 2 and ratchet 4, turns the ratchet and its connected gear 6 in a counterclockwise direction when viewed as in FIG. 2. Through conventional mechanism which is not part of the present invention, the movement of the lever 1 tensions the shutter, by connections leading either directly from the lever itself or from the gear 6 which is rotated by the lever.

In the above described upper position of the slip clutch assembly 12, the gear 7 thereof is in mesh with the gear 6, so the gear 7 is rotated when the movement of the lever 1 rotates the gear 6.

Since the gear 7 meshes also with the gear 18 which drives the film feeding and measuring sprocket 20, this sprocket is driven to the required extent to advance the film. Also the rotation of the gear 7, acting through the slip clutch 12, drives the gear 8 which meshes with and drives the intermediate gear 16 which, in turn, drives the connection 17 of the film take-up spool. As the diameter of the film on the take-up spool increases during successive film feeding operations, less rotary motion of the take-up spool is needed during each film feeding operation, and this can be accommodated without damage to the film by the action of the slip clutch 12, which allows the gear 8 to slip relative to the gear 7.

When the film feeding is completed, the operator depresses the camera release 41, which trips or triggers the shutter in the conventional manner, the connections to the shutter not constituting part of the present invention. Thus the exposure is made, and the camera is ready for another stroke of the feeding lever 1, to tension the shutter again and to feed the film again.

However, if the photographer now wishes to make a double exposure on the same frame previously exposed, he turns the control knob 30 and shaft 25 counterclockwise (when viewed as in FIG. 1) to its extreme counterclockwise position, before he operates the lever 1. This movement of the shaft 25 causes the left hand corner of the flat surface 31 to bear downwardly on the flat surface 32 of the lever 29, to depress the right hand end of this lever, and at the same time brings the notch 35 around to a position opposite the lug 37 on the slide 38, so that the spring 39 of this slide moves the slide slightly rightwardly to seat the lug 37 in the notch 35. The just described downward motion of the lever 29 causes downward motion of the pin 28 carried by this lever, and the pin depresses the arm 26 which is connected to the forked yoke or shifter 24, thereby bearing down on the upper edge of the hub of the gear 7, and depressing the entire slip clutch assembly 12 until the bottom of the bushing 9 thereof is firmly seated on the stationary flange 45, thereby frictionally locking the slip clutch assembly against rotation. This downward motion also disconnects the gear 7 from the gear 6. While the parts are in this position, the operator swings the lever 1 through its range of travel, thereby tensioning the shutter. However, this does not result in any feeding of the film. The operator may now make another exposure on the same film frame previously exposed, by depressing the release member 41 which, just as in the normal or basic mode of operation, will trigger or trip the shutter to make an exposure. In addition, the downward motion of the camera release 41 will cause downward motion of the pin 42, which will engage the inclined cam surface 40 on the slide 38 and move this slide leftwardly a short distance, releasing the lug 37 from the notch 35, so that the upward pressure of the lever 29 (caused by the spring 44) acting on the corner of the flat portion 31 of the shaft 25 will restore this shaft clockwise to its basic or normal position. Then at the next operation, movement of the lever 1 will feed the film as well as tension the shutter. Of course another multiple exposure can be made again before feeding the film, if desired, by again moving the knob 30 and shaft 25 counterclockwise to the double exposure position. At the end of each multiple exposure the shaft 25 is automatically restored to the basic operating position, by the action of the pin 42 on the cam 40, releasing the lug 37 from the notch 35.

When all the desired exposures are completed and the time has come to rewind the film from the take-up spool back on to the supply spool, the knob 30 and shaft 25 are moved clockwise to the limit position, which is the position illustrated in FIG. 1. This depresses the lever 29 and depresses the shifting yoke or fork 24 in the same way as when making a double exposure, but does not depress the yoke to quite the same extent. Therefore, the bottom of the slip clutch assembly is not pressed against the stationary flange 45, and hence the slip clutch assembly is not locked against rotation. It is moved downwardly, however, far enough to disconnect the gear 7 from the gear 6, and also far enough to bring the top surface of the pinion 18 down to an elevation below the bottom surface of the drive pin 19. Thus, during the rewinding (performed by conventional connections not forming part of the present invention) the take-up spindle 17 is free to rotate because the slip clutch assembly 12 is free to rotate, and the metering sprocket 20 is free to rotate because the pinion 18 is no longer engaged with the drive pin 19. Rewinding of the film can thus be accomplished in a rapid and easy manner, without hinderance.

What is claimed is:

1. A photographic camera comprising an operating lever movable to tension a shutter, a first gear operatively connected to and moved by said lever, film feeding means including a second gear meshing with said first gear and driven thereby to cause feeding of film concomitantly with tensioning the shutter, means including a manually operable element for shifting said second gear axially to unmesh it from said first gear so that said lever may be moved to tension said shutter without causing feeding of film, a camera release member operable to release said shutter to make an exposure, and means responsive to operation of said release member for restoring said second gear to meshing relation to said first gear if said second gear has been unmeshed therefrom.

2. A camera as defined in claim 1, wherein said manually operable element has a basic portion in which said second gear is operatively meshed with said first gear, a multiple exposure position in which said second gear is unmeshed from said first gear and tightly engaged with a stationary part to hold it against rotation, and a rewind position in which said second gear is also unmeshed from said first gear and is freely rotatable.

3. A camera as defined in claim 2, further comprising a rocker arm (24) for shifting said second gear axially from a meshing position to an unmeshing position with respect to said first gear, and means operatively connecting said manually operable element to said rocker arm.

4. A camera as defined in claim 3, wherein said means for unmeshing said second gear includes a lever (29), cam means (25, 31) operated by said manually operable element for moving said lever, and means operatively connecting said lever to said rocker arm to move said rocker arm is response to movement of said lever caused by movement of said cam means as a result of movement of said manually operable element.

5. A camera as defined in claim 4, wherein said element comprises a shaft portion and said cam means comprises a flat surface on said lever and a substantially diametrical surface on said shaft portion for engagement with said flat surface on said lever to displace said lever when said shaft portion is turned.

6. A camera as defined in claim 2, further comprising spring means tending to restore said manually operable element to its said basic position when displaced therefrom, latch means (35, 36 37) for holding said manually operable element in a displaced position, and means (40, 42) operated by said camera release member for disabling said latch means so that said spring means may restore said element to its basic position.

7. A camera as defined in claim 2, wherein said manually operable element includes a notched disk (33), said camera further comprising a latching lug and a spring tending to move said latching lug toward the periphery of said disk to enter a notch thereof, said disk having a central notch receiving said lug when said element is in its said basic position, a second notch displaced in one circumferential direction from said central notch for receiving said lug when said element is in its multiple exposure position, and a third notch displaced in an opposite circumferential direction from said central notch for receiving said lug when said element is in its rewind position.

8. A camera as defined in claim 7, wherein said second and third notches have a greater radial depth than said central notch.

9. A camera as defined in claim 7, wherein said central notch has inclined ends so that said element may be manually turned when said lug is in said central notch, thereby camming said lug out of said central notch.

10. A camera as defined in claim 7, wherein said third notch is closer to said central notch, in a circumferential direction, than said second notch, so that less rotation is required to turn said element from its basic position to its rewind position than to turn it from its basic position to its multiple exposure position.

11. A camera as defined in claim 1, wherein said film feeding means includes a film drive member operatively connected to and driven from said second gear when said second gear is in meshing relation to said first gear, said second gear being operatively disconnected from said film drive member when said second gear is in unmeshing relation to said first gear.

12. A camera as defined in claim 1, further comprising spring means tending to maintain said second gear in meshing relation to said first gear.

13. A camera as defined in claim 1, wherein said film feeding means includes a third gear (8), and slip clutch means operatively driving said third gear from said second gear (7).

14. A camera as defined in claim 1, wherein said film feeding means includes a film advance member (20, 23) and a separable connection (18, 19) between said advance member and said second gear (7).

15. A photographic camera comprising an operating lever (1) movable to tension a shutter ready for making an exposure, a camera release member (41) operable to release said shutter to make an exposure, a film metering member (20), a film take-up spool drive member (17), disengageable transmission means for driving said metering member and said spool drive member from said operating lever, and a manually operable control element (30) shiftable to any one of three operative positions comprising a first position for normal camera operation and a second position for double exposure operation and a third position for film rewinding operation, said disengageable transmission means including a first gear (6) operatively connected to said operating lever to be driven thereby, a second gear (7) axially movable from a first position meshing with said first gear to a second position unmeshed from said first gear and tightly engaged with a stationary part (45) to be held thereby against rotation and to a third position intermediate between its first and second positions and unmeshed from said first gear but not engaged with said stationary part, said transmission means further including means driving said metering member from said second gear and slip-clutch means driving said spool drive member from said second gear, means responsive to movement of said control element from its first position to its second position for shifting said second gear axially from its first position to its second position, means responsive to movement of said control element from its first position to its third position for shifting said second gear axially from its first position to its intermediate third position, and means responsive to operation of said camera release member for shifting said second gear axially to its first position meshing with said first gear if said second gear is not already in its first position.

* * * * *